(12) United States Patent  (10) Patent No.: US 9,259,113 B2
Howitt et al.  (45) Date of Patent: Feb. 16, 2016

(54) CORDLESS ELECTRICAL APPLIANCES

(75) Inventors: James Howitt, Colby (GB); David Harper, Manchester (GB); Colin Cameron, West Yorkshire (GB)

(73) Assignee: Strix Limited, Ronaldsway (IM)

( * ) Notice: Subject to any disclaimer, the term of this patent is extended or adjusted under 35 U.S.C. 154(b) by 782 days.

(21) Appl. No.: 13/508,276

(22) PCT Filed: Nov. 4, 2010
(Under 37 CFR 1.47)

(86) PCT No.: PCT/EP2010/006736
§ 371 (c)(1),
(2), (4) Date: Aug. 6, 2012

(87) PCT Pub. No.: WO2011/054522
PCT Pub. Date: May 12, 2011

(65) Prior Publication Data
US 2013/0016462 A1    Jan. 17, 2013

Related U.S. Application Data

(60) Provisional application No. 61/257,978, filed on Nov. 4, 2009.

(30) Foreign Application Priority Data

Nov. 4, 2009   (GB) .................................. 0919331.9

(51) Int. Cl.
H05B 1/02    (2006.01)
A47J 27/21   (2006.01)

(52) U.S. Cl.
CPC .................................. *A47J 27/2105* (2013.01)

(58) Field of Classification Search
CPC . A47J 27/2105; H05B 1/0258; H05B 1/0269; H05B 2203/03; H05B 1/02; H05B 1/0202
USPC .................. 219/482, 483, 507, 508, 494, 478
See application file for complete search history.

(56) References Cited

U.S. PATENT DOCUMENTS 5,117,092 A * 5/1992 Shimizu et al. ............... 219/247
5,895,595 A * 4/1999 Haden ........................... 219/432

(Continued)

FOREIGN PATENT DOCUMENTS

CN   201147199   11/2008
CN   201189100    2/2009

(Continued)

OTHER PUBLICATIONS

Chinese office action for CN201080060672.1 dated Jan. 14, 2014.

*Primary Examiner* — Mark Paschall
(74) *Attorney, Agent, or Firm* — O'Shea Getz, PC

(57) ABSTRACT

A cordless electrical appliance comprises an appliance part comprising at least two functional components (T1, M1) and a base for supplying electrical power to the appliance part. A cordless electrical connector (6) makes electrical connection between the appliance part and the base part in use. Both of the functional components (T1, M1) are connected between a pair of electrical connections provided by the connector (6) and arranged such that at least one of the functional components (T1, M1) is selectively energised in response to a change in the relative polarities of the two electrical connections. A switch such as a diode (D1) may be provided between the two functional components (T1, M1), so as to switch ON or OFF the current to a functional component (T1, M1) depending on the polarity of the connections.

16 Claims, 10 Drawing Sheets

(56) References Cited

U.S. PATENT DOCUMENTS

2009/0001070 A1* 1/2009 Scott et al. .................... 219/438
2009/0173235 A1* 7/2009 Kollep et al. ................... 99/279
2010/0270284 A1* 10/2010 Cohen et al. .................. 219/429
2011/0058798 A1* 3/2011 Garvey et al. ................. 392/444

FOREIGN PATENT DOCUMENTS

| CN | 201308394 | 9/2009 |
| WO | 0128294 | 4/2001 |
| WO | 2010041003 | 4/2010 |

* cited by examiner

CORDLESS ELECTRICAL APPLIANCES

This application is entitled to the benefit of, and incorporates by reference essential subject matter disclosed in PCT Application No. PCT/EP2010/006736 filed on Nov. 4, 2010, which claims priority to Great Britain Application No. 0919331.9 filed Nov. 4, 2009 and U.S. Patent Application No. 61/257,978 filed Nov. 4, 2009.

BACKGROUND OF THE INVENTION

1. Technical Field

The use of a cordless electrical connector in domestic appliances such as kettles, coffee/tea makers and irons for supplying power e.g. to the heating element thereof, and the benefits this brings, are well known. Cordless connectors which allow for engagement of the appliance with the power base regardless of their relative angular orientation, often known as 360° connectors, are popular due to the ease of use which they provide. An example of a basic 3-pole electrical connector is disclosed in the Applicant's prior application published as WO 95/08204. Such a connector is available from Strix Limited under the product name P72.

2. Background Information

In its basic form the appliance part of the cordless connector has, on its underside, a central line pin and two concentric annular conductors. The smaller diameter conductor is for the neutral component of the mains supply, whilst the outermost one is an earth connection. The corresponding base part of the connector has a central aperture for the line pin surrounded by an annular slot for receiving the neutral ring. Electrical connection is made via sprung contacts inside the base connector part below the aperture and a portion of the annular slot respectively, which are biased against the line pin and neutral ring respectively. The base connector part fits within the outermost earth ring of the appliance connector part and has an outwardly sprung contact on one side for making connection to the inner face of the earth ring.

The Applicant has also devised a 5-pole cordless electrical connector which provides two further electrical connections in addition to the basic power connection to the appliance. Such a 5-pole connector is described in the Applicant's prior application published as WO 01/28294. An example is available from Strix Limited under the product name P76. The P76 connector is designed to interface with a Strix U67 control unit, wherein a temperature sensor is connected via the two additional conductor rings in the connector to provide temperature information to control circuitry provided in the power base, for example to a Strix EK03 base electronic control system. An advantage of 5-pole connectors such as the Strix P76 connection system is that the control unit may be provided in the power base while a main electrical component such as a heating element and a further functional component such as a temperature sensor may be provided remotely in the appliance, with the cordless connector enabling both power transmission to the main component and data/control signals to be transmitted to and from the functional component via the additional connections. This has the advantage that electrical power to the control unit in the base may be maintained regardless of whether the appliance is on the base or not. Also the functional component may be placed in an optimum position in the appliance for its intended purpose. In the case of a sensor, for example, it may be positioned in close proximity to the main component so as to be capable of accurately sensing operation of the main component.

It has been recognized by the Applicant that it may be desirable to provide more than one functional component in the appliance in addition to the main power-drawing component. Electronic beverage making appliances, for example, may provide various functions in addition to heating liquid. Further functional components in the appliance may include a temperature sensor, illuminating means, liquid pump, motor for moving parts such as an infusion basket for tea or a grinder for coffee, etc. However each functional component will require one if not two electrical connections in addition to the three standard power connections (line, neutral, earth) to the main component.

Although one theoretical solution is to increase the number of terminals in the cordless connection system, for example moving from a 5-pole connector to a 7-pole connector, this is undesirable for a number of reasons, e.g. the connector would become larger and heavier, and as the number of conductors increased it would become more difficult to engage the two connector parts, in particular over a range of angles as is desirably provided by a 360° connector. Furthermore it would significantly increase the cost of the connector system to include further terminals.

Furthermore the Applicant has appreciated that in any electrical appliance comprising a cordless connector it may be desirable for two components in the appliance to be able to share a common pair of electrical connections provided by the connector.

SUMMARY OF THE DISCLOSURE

According to the present invention there is provided a cordless electrical appliance comprising: an appliance comprising at least a first and a second electrical functional component; a base for supplying electrical power to the appliance; and a cordless electrical connector for making electrical connection between the appliance and the base in use; wherein both the first and second functional components are connected between a pair of electrical connections provided by the connector and arranged such that at least one of the functional components is selectively energized in response to a change in the relative polarities of the two electrical connections.

Thus it will be seen that in accordance with the invention two functional components are connected to the same two electrical connections provided by the cordless connector in a circuit which is arranged such that current is selectively applied to one of the components when the relative polarities of the two terminals are switched over. This means that energization of at least one of the two functional components can be controlled simply by reversing the polarities on the connector terminals. This is a very convenient way of effectively switching between two components with a single connection pair. Preferably a control means, for example an electronic control, is arranged to switch the relative polarities of the two electrical connections. The functionality of the appliance can thereby be improved without requiring any further electrical connections.

Although the electrical connections provided by the connector may supply AC, this may make it less straightforward to set up a circuit in which one of the components is selectively energized simply in response to a change in polarity. If an AC current were to be applied then its own changing signal alone would not result in selective energization of one of the functional components; rather, both of the components would be energized by a normal alternating current. In order to achieve selective energization, rectification could be used so as provide a positive voltage signal providing one polarity and a negative voltage signal providing the opposite polarity, for example. One or more transistors and/or diodes may be used.

A particular advantage of the invention is that the two electrical connections may be connected to a DC supply with one of the functional components being selectively energized depending solely on the voltage difference between the two connections. Thus in one set of preferred embodiments an analog DC voltage is used to selectively operate the two functional components. No digital control commands or other means of telemetry are necessarily required to control when the functional unit becomes operational. There is therefore provided a very straightforward solution to the problem of controlling two functional components from a shared pair of electrical connections. In some embodiments it is preferred that the two electrical connections do not carry any digital signals. However, in other embodiments digital signals may be used to provide additional functionality for components in the cordless appliance beyond the selective energization provided by switching polarities.

Various circuit arrangements may be used to selectively energize at least one of the functional components in response to a change in the relative polarities of the two electrical connections. For example a switch means could be arranged to select between two separate circuits for the two functional components. However the Applicant has devised a particularly simple and elegant arrangement wherein preferably the first and second functional components are connected electrically in parallel between the two electrical connections provided by the connector and a switch means is provided between the first and second functional components, the switch means being arranged to switch ON or OFF depending on the relative polarities of the two electrical connections. The switch means may be in either branch of the parallel circuit.

It is therefore preferred that the two functional components are connected to the same two electrical connections provided by the cordless connector with a switch for selectively diverting the current in the parallel circuit, the switch being controlled by reversing the relative polarity applied to the two terminals. This means that there is selectively provided an electrical connection to one of the two functional components simply by reversing the polarities so that one of the components is switched either into or out of the parallel circuit. This is a very convenient way of switching between two components with a single connection pair. Furthermore the electrical circuitry in the appliance may be relatively uncomplicated. It is often desirable to keep control circuitry in the appliance to a minimum and to effect most of the control from the base.

Although the switch means may take any suitable form, it preferably comprises a switching circuit or component which preferentially conducts electrical current in one direction, i.e. a unidirectional switch means. Thus when the polarities of the two electrical connections provide a current in the direction favored by the switch then it is substantially ON but when the polarities of the two electrical connections are swapped such that the current is no longer in the favored direction then the switch is substantially OFF. The switch means preferably comprises a diode. This is a low-cost and readily available component which substantially only conducts current in its forward direction. When connected in its reverse direction a diode will consume very little power. The main advantage of a diode is that it very simply provides a switching function for DC current in response to the relative polarities of the two electrical connections made thereto.

The switch means may be separate to the functional components or it may be provided integrally by one of the functional components. Where the functional component is itself a unidirectional device, such as a light-emitting diode (LED), then it can advantageously provide the switch means by itself.

In less preferred embodiments the switch means may comprise a switch component other than a diode, for example a set of switch contacts, a relay or a triac. However such switch means probably would not be able to switch directly in response to the polarities of the two connections being reversed, as they are typically bidirectional switches. Additional circuit components and/or control commands would be required in addition to the DC current and thus the benefits outlined above would not be realized to the same extent as with a unidirectional switch such as a diode.

The relative polarities of the two connections could be switched by a control means provided in the appliance part of the connector. However it is desirable to minimize the number of components in the appliance and to avoid the loss of power which will occur when the cordless appliance is lifted from the base. It is therefore preferred that the base comprises a control means for controlling the relative polarities of the two connections and thus preferably controlling selective operation of the first and second functional components. Advantageously, the control means can easily select which of the functional components is energized from its side of the connector. Thus the electrical supply to the connector is preferably regulated by a control means in the base of the appliance.

The control means in the base may comprise an analog control circuit. Logic circuitry may be included. However it is preferable that the control means in the base comprises an electronic control unit. The term 'electronic control unit' as used herein is to be understood to relate to a control circuit comprising a programmable processor. At least in some preferred embodiments the electronic control unit comprises an integrated circuit such as a microcontroller unit (MCU).

The electronic control unit preferably comprises a printed circuit board mounting one or more components of the electronic control. Such a circuit board may be connected to the terminals of the cordless connector part provided in the base by flying leads.

It will be appreciated that the electronic control unit can be programmed to switch between the two functional components, by switching the polarities on the two electrical connections, in any way that is desirable depending on the appliance and the nature of the components. Even an analog control circuit could be arranged e.g. with an appropriate timer to change over the polarities.

According to one set of embodiments the polarities of the two connections may be switched back and forth substantially regularly. An electrical connection may be established for approximately equal time periods between the two terminals, or the control may only switch ON one component for a relatively short time interval as compared to the connection to the other component. According to another set of embodiments the polarities of the two connections may be switched intermittently, for example only when there is a demand to connect to one component instead of the other. Of course the control may apply more than one switching regime.

In one set of embodiments the first and second functional components comprise first and second sensing means. The two sensing means may each provide a signal indicative of a respective physical state of the appliance. For example, the first sensing means may comprise a magnetic switch such as a reed switch or Hall probe that is arranged to detect when a part of the appliance is fitted or in position. The second sensing means may comprise a thermal sensor such as a thermistor that is arranged to detect a temperature of or in the appliance. In this set of embodiments it is preferable that the switch means is arranged in the same branch of the parallel circuit as the second sensing means. When the switch means is ON an electrical connection is established to the second sensing means and preferably a signal is mainly taken from this branch of the circuit, for example for substantially continuous temperature monitoring. It is preferred that only when the switch means is OFF does the electrical connection to the first sensing means provide a different signal indicative of another sensed parameter, for example to check that an operating part of the appliance is still in position. If there is no signal from the first sensing means, or a change in that signal, then it can be detected that there is a problem with the appliance. Of course the two sensors could be swapped around, for example to provide mainly for monitoring of a magnetic switch and less often for temperature monitoring. Other sensors may of course be used.

In one set of the embodiments the first functional component comprises a sensing means and the second functional component comprises an operational means. The sensing means preferably provides a signal indicative of the operation of the appliance. The sensing means may be a low power component, for example a thermal sensor such as a thermistor. As mentioned above, the sensing means may be a magnetic sensor. The operational means preferably draws power via the connector to run one of the appliance's physical functions. The operational means may, for example, comprise one or components such as a motor, a light e.g. one or more LEDs, a sound emitter or a display. Of course the operational means could include a switch in series with an operating component such as a motor or illumination means or display. The operational means may even include a microcontroller arranged in the appliance so as to control several different functions, although such arrangements may not benefit from the simplicity that is provided by the present invention.

In these embodiments it is preferable that the switch means is arranged in the same branch of the parallel circuit as the operational means. When the switch means is ON an electrical connection is established to the operational means and preferably power will mainly be supplied to this branch of the circuit, with preferably very little current being drawn by the sensing means. It is preferred that only when the switch means is OFF does the electrical connection to the sensing means provide a signal indicative of the sensed parameter.

The control is preferably arranged to temporarily switch OFF the operational means only when it is required to take a sensor measurement. This could be programmed to occur regularly or on demand. The polarities may only be switched over momentarily to allow the sensor reading to be taken before switching the operational means back into the circuit. It will be appreciated that this advantageously allows both a sensor and an operating unit to be connected via the same pair of terminals in the cordless connector with very little, if any, detriment to their respective functions.

Where one of the functional components comprises an operational means such as a motor, it may be desirable that power is only switched to this part of the circuit when the appliance is ready for the relevant part to be operated. Otherwise power may be wasted unnecessarily and/or the operational means may suffer damage. In one set of embodiments there is therefore provided a magnetic switch (e.g. a reed switch or Hall sensor) in series with the operational means. The magnetic switch may be arranged such that its contacts are closed only when a part of the appliance to be operated, such as an infusion chamber, is physically in position e.g. so as to apply a magnetic field to the switch. Current can then flow to the operational means. If the part to be operated is removed from its position in the appliance then the magnetic sensor will detect the missing part (through the absence of a magnetic field) and open the switch contacts so that the operational means cannot be energized until the part is replaced.

As described above, only one switch means may be required in order to substantially divert the current from the first functional component to the second functional component, i.e. by switching the second component into parallel with the first. However the efficacy of this arrangement depends on the relative current draw of the two components. Such an arrangement may not be desirable in some circumstances, for example where both components draw a substantial current when connected in parallel and it is desired to effectively switch between them.

In one set of embodiments there may be provided a further switch means in the parallel circuit. A first switch means is preferably associated with the first functional component, in one branch of the parallel circuit, and a second switch means is preferably associated with the second functional component, in the other branch of the parallel circuit. Preferably the first and second switch means are both unidirectional switches such as diodes. Further preferably the first switch is arranged to operate in one direction while the second switch is arranged to operate in the opposite direction. The advantage of this arrangement is that current will only flow in one branch of the parallel circuit at a time, either through the first functional component or the second functional component, while the other component is switched completely out of the circuit. This may be desirable where the functional component would otherwise draw current unnecessarily were it not switched out of the circuit. As described above, however, some low power components may be connected without an associated switch as they draw very little current even when left connected in the parallel circuit.

It will be appreciated that the first and second functional components may each be single electrical components, although of course they may each also comprise multiple components where desired. For example, one of the functional components may comprise an LED in series with a motor such that illumination of the LED signals operation of the motor. The multiple components making up a functional component may be connected in series or in parallel, or in any combination of sub-circuit arrangements. Many different combinations of electrical components are envisaged depending on the appliance and its various functions.

The Applicant has recognized that it may be desirable for the appliance to include means enabling its identification by a power supply base when connected thereto, for example identifying whether it is a conventional kettle or a beverage maker, and even identifying one or more of the functional components in the appliance. This is because different appliances and their functional components may require different current/voltage levels, and/or different kinds of current supply e.g. pulsed or continuous, to be supplied by the power base. For example, a functional component comprising a pump may require 12 V while an LED may only require 2 V. Furthermore it will be understood that the same power base may be designed for use with a number of different cordless appliances comprising different functional components, or with some appliances such as a conventional kettle that do not require selective energization of a functional component. The base may, for example, be manufactured and sold to different appliance makers. And/or the base may be sold for use with different appliances in the home, including kettles, tea makers, coffee makers, etc. In either situation, it would be desirable for the base to be able to recognize a given appliance and/or one or more of the functional components in the appliance when an electrical connection is made thereto.

One possible way of identifying an appliance or a functional component in an appliance could be to integrate a digital signature that may be transmitted with signals from the appliance to the base. However, as mentioned above, it may be preferred that the pair of electrical connections to the functional components do not carry any digital signals so as to fully enjoy the benefits of the invention. It may be preferred that there is no electronic control unit such as a microcontroller provided in the appliance. Thus it is preferable for the analog signal from a particular appliance and/or functional component to be modified so as to enable the appliance and/or component to be identified by the base. For instance a pump for a tea infusion basket may draw current at the same voltage as a motor for a coffee maker, but it may be desirable for the power base to be able to differentiate between these two different appliances, for example because the pump in a tea maker is best operated continuously while the motor in a coffee maker (e.g. for grinding coffee and/or pumping water through coffee grounds) is best operated for a limited period of time or intermittently.

The Applicant has recognized that a particularly simple and cost effective way of identifying a functional component in a cordless appliance is to preferably provide a resistor in parallel with the component. The resistance value connected in parallel to a particular functional component can be tailored so as to form a potential divider circuit representing an overall resistance unique to that component and/or appliance. The magnitude of the voltage across the pair of electrical connections may therefore be used to identify the appliance, and preferably a functional component, that is drawing current, even if the rated voltage of the appliance and/or component is the same as another. A control, for example an electronic control in the power base, may then use that information when setting the mode of operation and/or adjusting the power to the electrical connections.

Either or both of the first and second functional components may be provided with a resistor connected in parallel for identification purposes. In one set of embodiments, the first functional component may represent a component common to different appliances, such as thermistor, that does not require identification while the second functional component may vary from one appliance to another, e.g. heater, pump, motor, etc., and may require identification. Such considerations may determine which of the functional components is provided with an identifying resistance. Even if both of the functional components have the same identifying resistance, the control may also recognize the polarity of the pair of electrical connections and thus recognize that a certain resistance value (or current) associated with a respective forward or reverse connection represents a particular type of functional component, thereby distinguishing between the first and second components in an appliance.

The cordless electrical connector may comprise a 3-pole cordless electrical connector. The two electrical connections may comprise the line and neutral terminals. This could be an attractive arrangement, for instance, where there is no electrical component in the appliance requiring a constant power supply. Even with one of the functional components requiring power, for example a heater, the system could switch temporarily to a second functional component such as a sensor only momentarily to take a measurement without significantly affecting operation, as is described above. Pulsed heating may be effected by the switch means.

However it is preferred that the cordless electrical connector comprises power connections in addition to the two electrical connections. Assuming that an earth connection is present, as is required by the safety standards in most countries, there will be three power connections (line, neutral and earth) and the cordless connector is preferably a 5-pole connector. Of course, it may only be a 4-pole connector if the power connections comprise line and neutral without earth.

The invention may also find application where data communication is integrated with the power lines of a 3-pole connector or with the two additional electrical connections of a 5-pole connector. Digital signals, for example, may be provided to an electronic control unit in the cordless appliance so as to increase the functionality of the appliance, for instance independently of an electronic control unit in the power base.

The connector terminals may be provided by an 'old-fashioned' style of cordless connector on which the terminals are provided in a row, but preferably the terminals are provided in a cordless connector which is of the type which allows placement of the vessel part on the base part substantially irrespective of their relative angular orientation i.e. a so-called 360° connector. In a preferred set of embodiments the female part of the connector (which could be provided either on the appliance or the base, but which is preferably provided on the base) comprises a plurality of concentric annular channels around the central aperture for receiving the corresponding annular terminals of the male connector part (which is preferably provided on the appliance) arranged around the central line pin.

Thus in a preferred set of embodiments the cordless connector comprises five electrical connections, with at least three of the terminals (line, neutral and earth) being compatible with a mains electricity supply for providing mains power to a main electrical component of the appliance. The two further terminals provide an electrical connection to the two additional functional components. The appliance is thereby provided with a high degree of functionality while all of the electrical connections between the base and the appliance are brought together in a single integrated connector.

The main electrical component is preferably provided with mains power, i.e. 240V in the UK, by the power connections (line and neutral). The main electrical component may be an electrical heater, for example where the appliance is an iron or a liquid heating appliance. However the main electrical component may instead be a motor for operating moving parts of the appliance, or any other electrical or electro-mechanical component. Of course a transformer may be provided where it is required to step up or down the voltage provided by the power connections.

The two additional electrical connections in the appliance part of the connector may also be at or near mains potential. In at least one preferred set of embodiments there is provided a small relative potential difference between the two connections. The voltage across the two connections is preferably around 5 V. A voltage difference up to about 12 V may be provided. Such lower voltages are sufficient to run many functional components, such as sensors and LEDs, especially when they are solid state devices. Even low-power motors and pumps may run on voltages much smaller than the mains. In fact it is beneficial for the two additional terminals to be relatively close in electrical potential as this enables the physical isolation, e.g. the separation distance, of the terminals to be reduced as compared, say, to the isolation necessary between the line and neutral terminals.

The two electrical connections may be connected to two power supplies in the base, with the voltage difference between the supply connections providing the voltage applied by the connector across the functional components in the appliance. Preferably there is effectively a low voltage supply to the two electrical connections due to this relative potential difference. The power supplies may be at or near mains voltage, for example one connection at 240 V and the other offset at 245 V to provide an effective voltage of 5 V between the electrical connections in the connector. Alternatively a single power supply may be used, with the two electrical connections offset relative to one another.

It has been appreciated by the Applicant that the invention may be applicable to various cordless electrical appliances. It may be particularly suitable for those appliances incorporating an electric heater, e.g. kettles, beverage makers, irons etc., as the heater preferably draws power continuously when in use with additional electrical connections being provided for other functional components. The invention is seen to be of particular benefit when applied to liquid heating vessels, such as kettles and beverage makers, since these have traditionally been provided with little functionality other than heating water and thus have a great potential to benefit from the functionality offered by two further components being connected in addition to the main heater by the same integrated cordless connector.

According to a set of preferred embodiments described above, a control in the base determines when power is selectively supplied to the functional components in the cordless appliance. However, even when there is no current being drawn via the cordless connector by any of the components in the appliance, the control preferably remains powered so that it can operate to re-connect the electrical connections to the appliance as required, e.g. without a delay while the control is re-connected to the power supply. This may be particularly important in appliances such as liquid heating vessels and irons where the cordless appliance may be repeatedly operated with relatively short periods of time between uses. In a domestic situation, for example, the liquid in a kettle may be boiled and then shortly after re-boiled and/or the kettle re-filled and liquid boiled again. However, there will also be relatively long periods of time when the appliance is not in use.

The Applicant has appreciated that it is desirable for electrical appliances to be completely powered off when not in use for extended periods of time, so as to avoid an unnecessary waste of energy when the control is in 'standby' mode. Where the control comprises an electronic control unit, for example, such a standby mode may consume a power of ~0.5 W. It is therefore preferred that where the base part comprises an electronic control unit for controlling operation of the appliance part, the electronic control unit controls both a switch means arranged to disconnect the supply of power from the base to the connector and a further switch means arranged to disconnect the supply of power to the control unit itself.

This arrangement is novel and advantageous in its own right and thus from a further aspect the invention provides a cordless electrical appliance comprising an appliance part, a base part for supplying electrical power to the appliance, and a cordless electrical connector for making electrical connection between the appliance part and the base part in use, wherein the base part comprises an electronic control unit arranged to control a first switch means for disconnecting the supply of power from the base to the connector and arranged to control a second switch means for disconnecting the supply of power to the electronic control unit.

Thus it will be understood that in accordance with this aspect of the invention the electronic control unit can put the appliance in a 'standby' mode, where there is no power supplied to the appliance part via the connector but the control unit is still powered, and can also separately remove all power to the electronic control unit itself so that the base part is not drawing any mains power (although it may still be connected to the mains supply). Advantageously the control unit turns off the whole appliance and itself without the need for a manual power-off switch or the like. Thus a user does not have to intervene to move the appliance from 'standby' mode to 'power off' mode. This can beneficially provide an automatic energy saving. Furthermore this can be achieved using a further switch means that comprises a low voltage, low cost switch such as a tactile switch.

In the standby mode the control unit is ready and can react to a user input to re-connect the power to the appliance through the cordless connector. In the case of a beverage making appliance, for example, the appliance may move into standby mode after a particular brewing cycle has been completed. However, a short time later the user may decide to re-heat or re-circulate the beverage and will give an appropriate command which is effected by the control unit. In order to provide for this functionality in the standby mode, it is preferable that the control unit does not activate the second switch to disconnect all power until a predetermined period of time has lapsed since the last operation of the first switch. This time period may be programmed depending on the nature and likely use of the appliance. The delay before the control unit turns itself off is preferably at least 30 s, 60 s, 90 s, 120 s, or up to 5 minutes. However it is preferred that the appliance is not in the standby mode for more than a few minutes so as to save on energy.

Once a user has turned on the power to the appliance, the base control unit is preferably arranged to respond to further user inputs and operational commands. The appliance may, for example, respond to a command to heat liquid to a certain temperature or to run a motor for a certain period of time. When the operation has been completed, the control unit preferably activates the first switch to disconnect the power supply to the appliance and thus moves into a standby mode. If the user does not input any further commands then preferably after a certain period of time the control unit will shut itself down completely by activating the second switch. However, if in the meantime the user decides to operate the appliance again then there is no need to manually re-connect power to the control unit.

In addition, there may be provided means for a user to command a switch off of the appliance. If a user commands the current operation of the appliance to cease, even if it has not run the full operation as programmed, then the control unit will activate the first switch to disconnect power to the appliance and move into standby. Again, there is preferably a time delay before the control unit activates the second switch to disconnect all power to the base. This advantageously results in a total powering off of the appliance, after the standby period, in response to a single user input to turn off.

The user input means, e.g. a push button, for turning the appliance on is preferably provided separately from the input means for selecting operations and/or turning the appliance off.

BRIEF DESCRIPTION OF THE DRAWINGS

Some preferred embodiments of the present invention will now be described, by way of example only, and with reference to the accompanying drawings, in which.

DETAILED DESCRIPTION OF THE INVENTION

Figure 1:
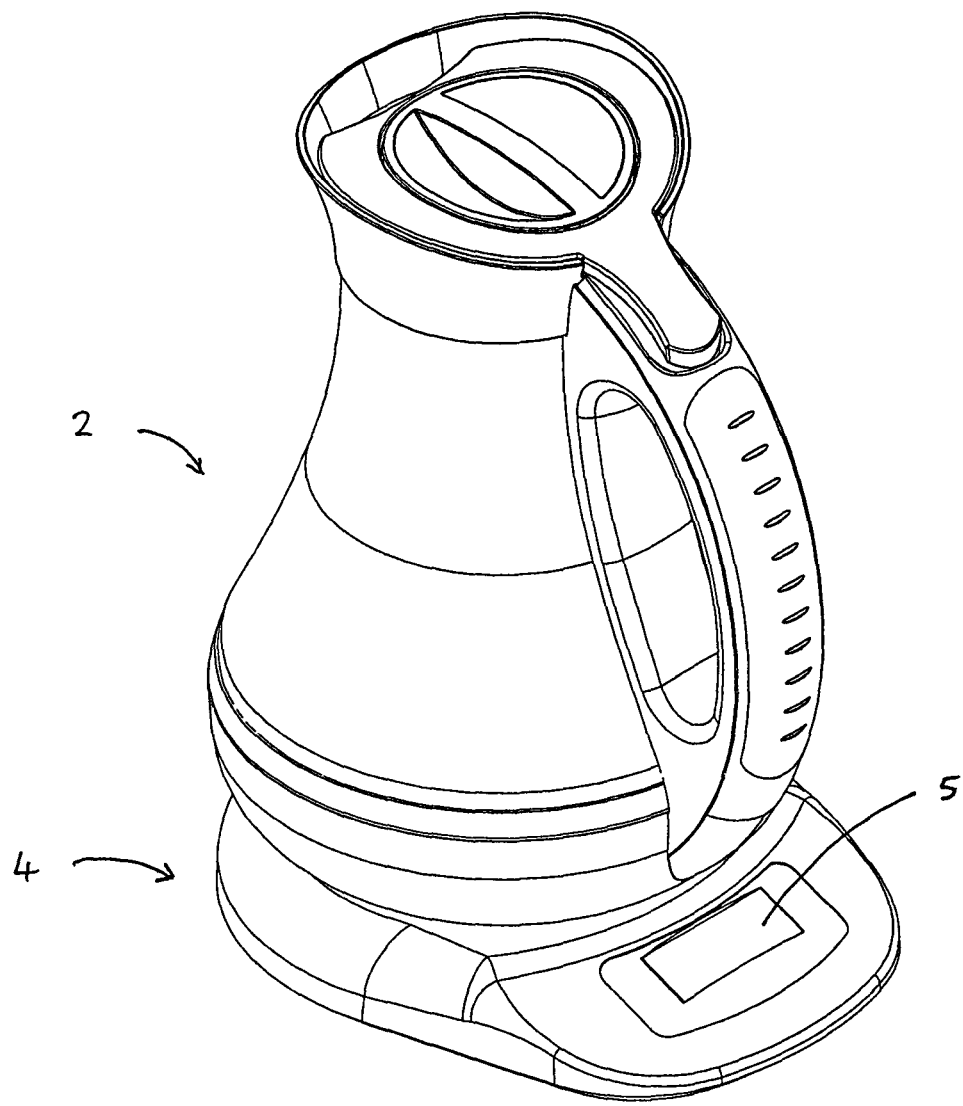
FIG. 1 is a perspective view of an exemplary liquid heating vessel incorporating a control system according to embodiments of the present invention.
Figure 2:
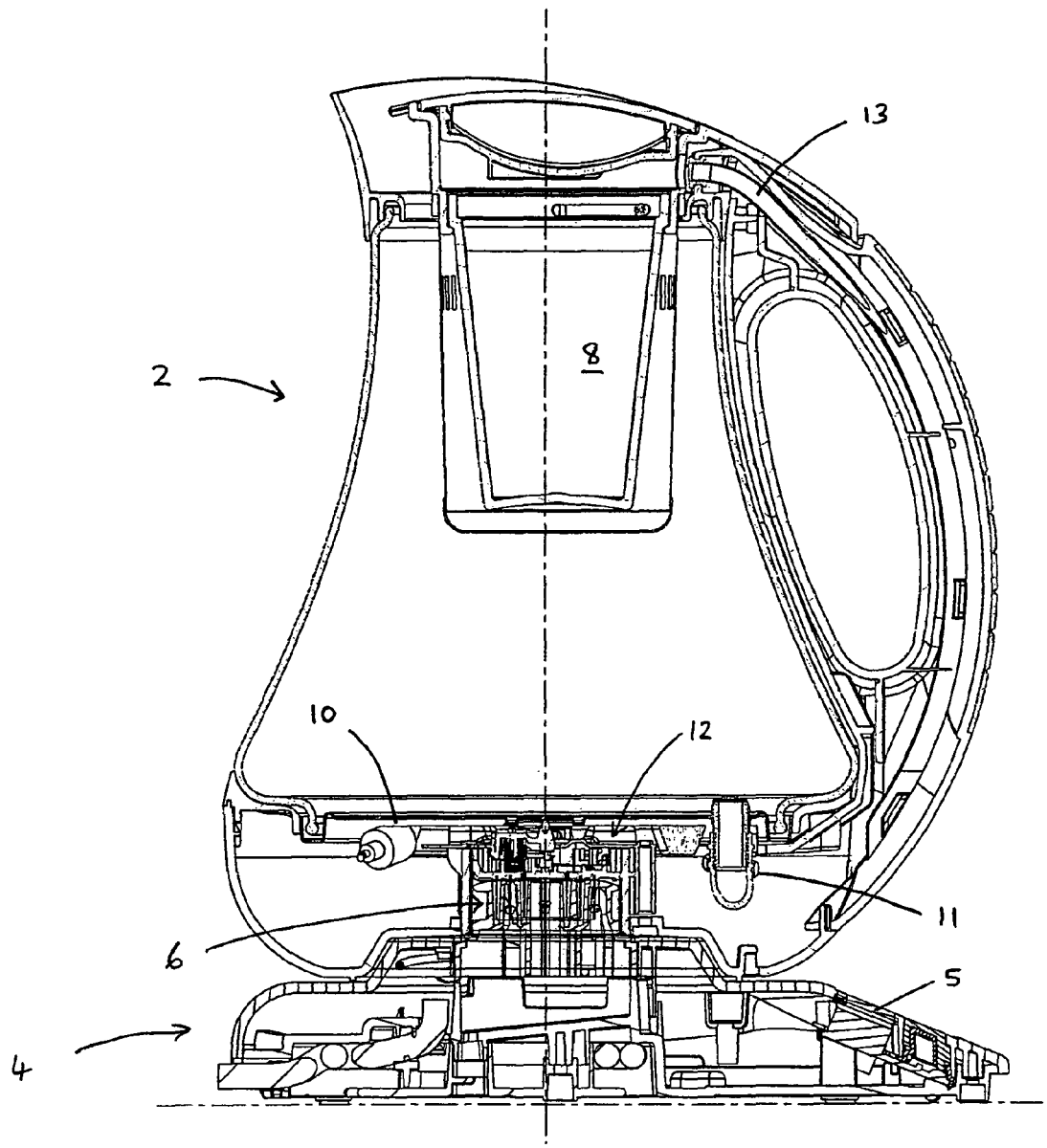
FIG. 2 is a cross-sectional view of the liquid heating vessel of FIG. 1.

Turning firstly to FIGS. 1 and 2, there is shown an exemplary liquid heating vessel. The appliance generally comprises a liquid heating vessel part 2 and a base part 4. Electrical connection between the vessel 2 and the base 4 is provided by a 360° cordless connector, designated generally by the numeral 6, which allows the vessel part 2 to be placed on the power base 4 in electrical connection thereto and to operate regardless of its relative angular orientation. The connector 6 may comprise a 5-pole cordless connection system such as the P76 available from Strix Limited. The base 4 includes a power lead (not shown) for connection to the mains power supply and a user interface 5.

The vessel part 2 is shown as a beverage making jug including an infusion chamber 8 for tea leaves or the like. An opening in the bottom part of the vessel 2 is closed by a heater 10 which may comprise a sheathed heating element or a thick film printed heater mounted to the underside of a heater plate. A pump 11 is provided in the bottom part of the vessel part 2 below the heater 10. The pump 11 is driven by a motor to transfer heated liquid from the main part of the vessel 2 into the infusion chamber 8, via a transfer pipe 13 embedded in the handle of the jug. Further details of such a tea-making appliance may be found in the Applicant's International patent application no. PCT/GB2009/002390 published as WO 2010/041003.

Figure 3:
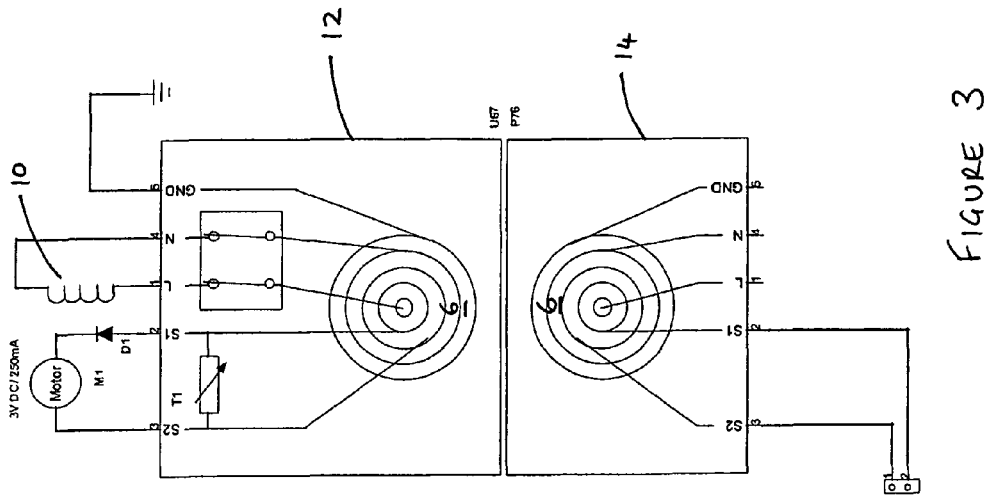
FIG. 3 is a schematic circuit diagram showing a control system according to an embodiment of the invention.
Figure 3:
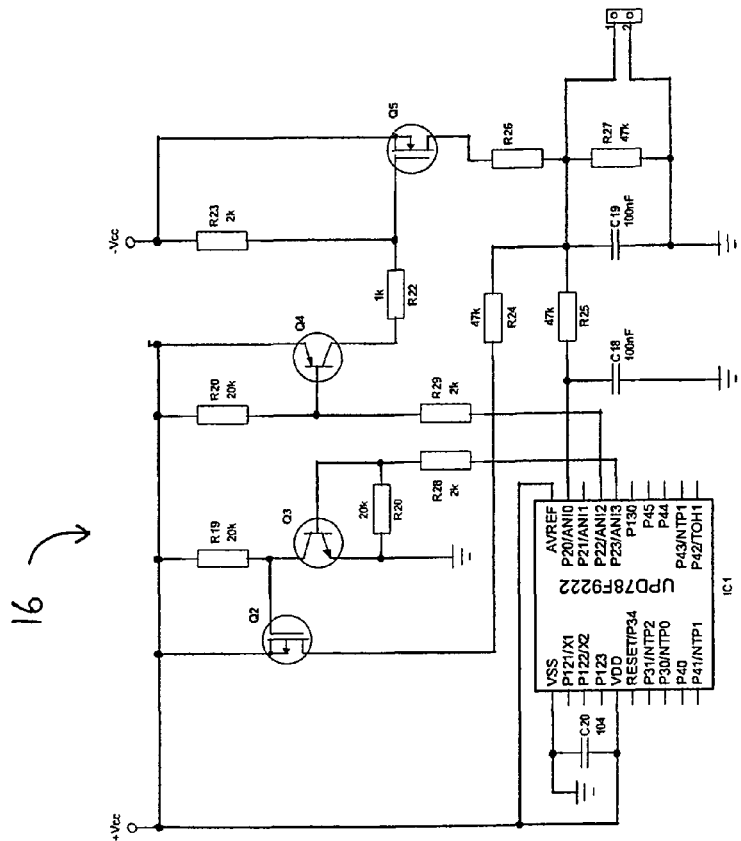

The (male) appliance part of the connector 6 is provided by an integrated connector and temperature limiter such as the U67 available from Strix Limited. Turning now to FIG. 3, it will be seen that the connector control unit is generally designated by the numeral 12. The connector control unit 12 connects the line L and neutral N terminals of the connector 6 to the heater 10. The heater 10 is also suitably earthed by being electrically connected to the earth ring of the connector 6. The control unit 12 also includes a thermistor T1 which is mounted in the bottom part of the vessel 2 so as to monitor the temperature of liquid in the vessel 2. The thermistor may, for example, be mounted to the heater 10 in a region which is thermally isolated from the element (e.g. as is described in EP 1762161 A1) or it may penetrate through the heater 10 to be in physical contact with the liquid in the vessel 2. The control unit 12 may further comprise a pair of bimetallic actuators for sensing an overheat condition of the heater 10 and to provide two-level protection against boiling dry or accidental dry switch-on of the appliance.

The (female) base part of the connector 6 is generally designated by the numeral 14 in FIG. 3. The connector 6 interfaces with an electronic control unit 16, such as the EK03 available from Strix Limited, which is provided in the power base 4. Flying leads are used to connect to the printed circuit board of the electronic control unit 16.

One embodiment of a control system for the appliance will now be described with reference to FIGS. 3 and 4. In the control system the five terminals of the connector 6 are designated GND for ground, N for neutral, L for line, and S1 and S2 for the two additional electrical connections. As mentioned above, the three terminals L, N and GND are connected to the heater 10 in the vessel 2 via the connector control unit 12. Connections S1 and S2 are connected to two functional components arranged in a parallel circuit in the vessel 2. The first functional component is the thermistor T1 provided by the connector control unit 12.

The second functional component in this embodiment is a motor M1 used to drive the liquid pump 11 in the vessel 2. A diode D1 is connected in series with the motor M1 in the same branch of the parallel circuit. The diode D1 allows a current to flow through to the motor M1 when the polarities of the connections S1 and S2 provide a forward current. However when the polarities provide a reverse current with respect to the diode D1 then no current flows in the branch of the circuit including the motor M1.

In addition, a magnetic switch such as a Reed switch or Hall effect sensor (not shown) may be provided in series with the motor M1 and arranged to detect when the infusion chamber 8 is in position and/or correctly positioned. Advantageously, when the polarities of the connections S1 and S2 are switched so as to provide a forward current, the motor M1 will automatically be energized as soon as the presence of the infusion chamber 8 is detected and the magnetic switch is closed. As a result of the magnetic switch, the pump 11 can only be operated when the infusion chamber 8 is present and the appliance is ready for use (at least in infusion mode). If the infusion chamber 8 is removed then the appliance may still be used to heat liquid in the vessel 2, but without pumping, i.e. in the manner of a conventional kettle.

The electronic control 16 in the base 4 includes a microcontroller IC1 and two independently switched power supplies +Vcc and −Vcc. Solid state switches Q2 and Q5 are controlled by the microcontroller IC1 to switch the polarity of the contacts S1 and S2. The other components of the electronic control 16 are not discussed in detail here. The connections between the line L, neutral N and ground GND terminals of the base connector part 14 and the electronic control 16 are not shown for clarity purposes. Applicant's WO 01/28294 may be referred to for details of these three basic connections.

Figure 4A:
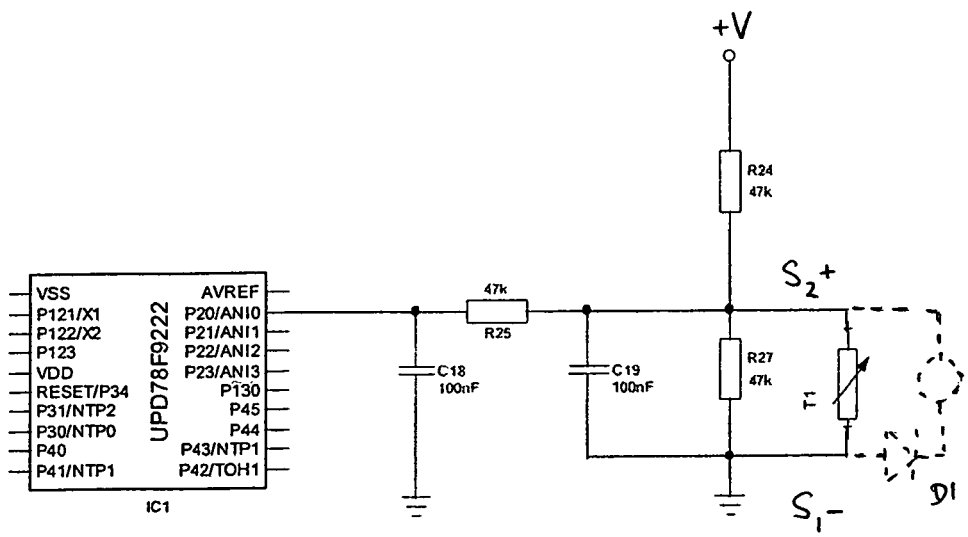
FIGS. 4a and 4b show a detail of the electrical connections S1 and S2 of FIG. 3 in the respective OFF and ON states of the motor.

Operation of the control system will now be described with reference to FIGS. 3 and 4. The microcontroller IC1 provides signals to operate the switches Q2 and Q5. With Q2 Switched ON and Q5 OFF a positive voltage is applied to contact S2 with respect to contact S1. In this configuration the diode D1 in series with the motor M1 is reverse biased and no current flows through the motor M1. The current drawn by the thermistor T1 can be measured. This is shown in FIG. 4a, with the motor branch of parallel circuit shown by a dashed line where there is no current.

As the resistance of the thermistor T1 varies with temperature, by combining this with resistors R27 and R24 in the control circuit 16 to create a potential divider, a voltage is generated at pin P20/ANI0 of the microcontroller IC1, which is proportional to the temperature of the thermistor T1 and thus to the temperature of the liquid being heated.

Figure 4B:
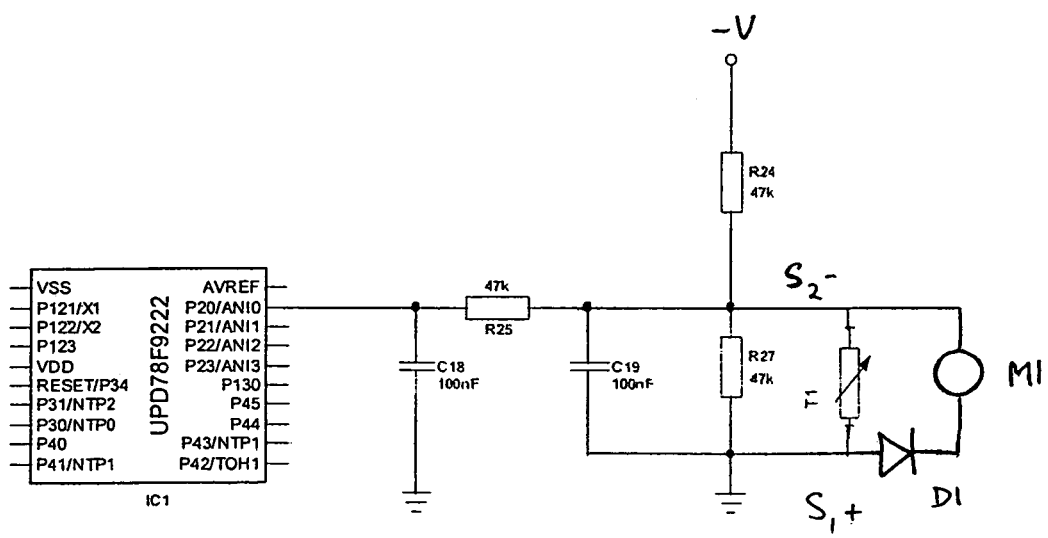

As is shown in FIG. 4b, when Q2 is switched OFF and Q5 ON by the microcontroller IC1, a positive voltage is applied to contact S1 with respect to contact S2 and the polarities are switched. The current provided by the connections S1 and S2 is now in the forward direction of the diode D1. Hence a current flows through both the motor M1 and thermistor T1, in their respective branches of the parallel circuit. As the thermistor T1 is not being used for measuring purposes and draws very little current, it does not matter that current flows through this component. The majority of the current is drawn by the motor M1 in operating the pump 11.

The control circuit 16 therefore allows control of both a motor M1 and measurement of temperature by a thermistor T1 through a single the set of contacts S1 and S2 provided by the connector 6.

Figure 5:
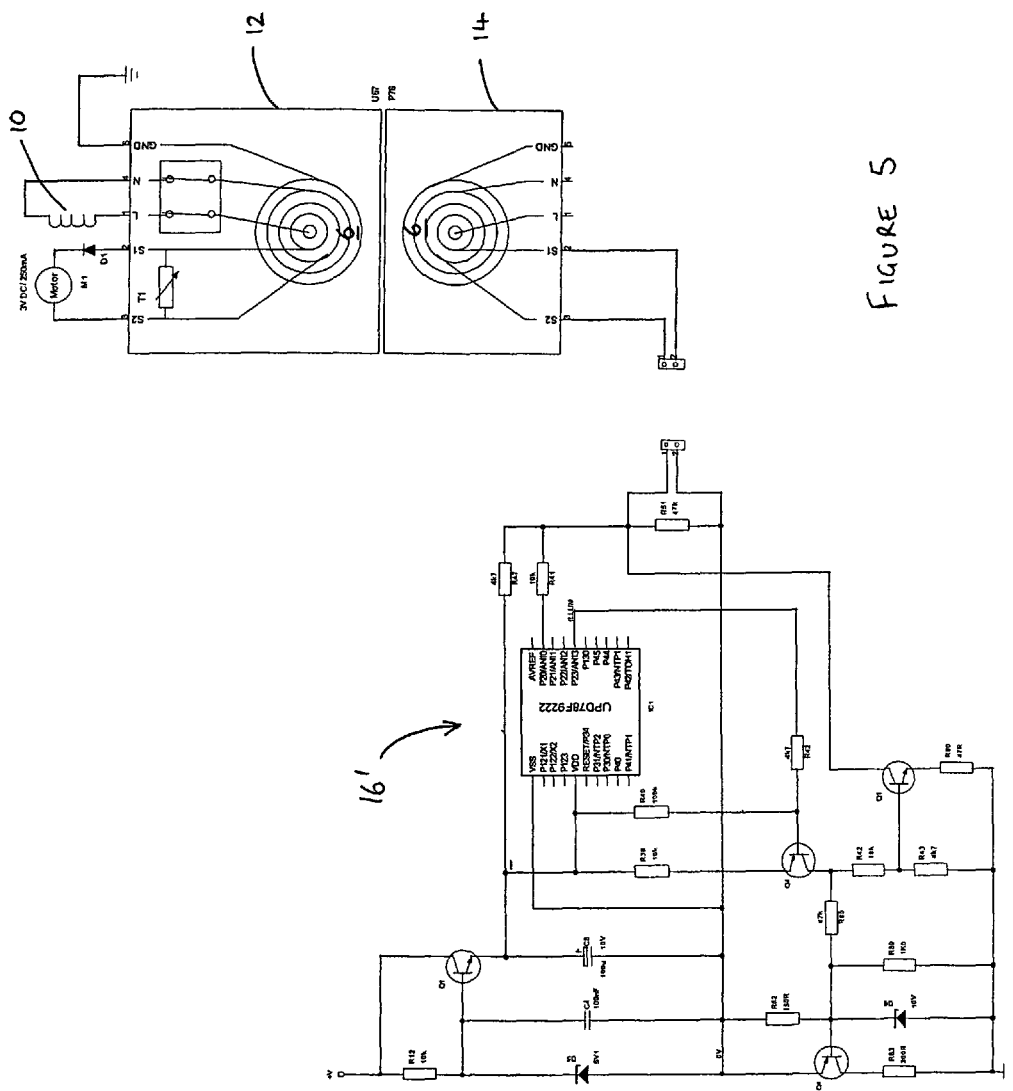
FIG. 5 is a schematic circuit diagram showing a control system according to another embodiment of the invention.

The control circuit 16 described above with respect to FIG. 3 uses two independently switched power supplies +Vcc and −Vcc, which are separately switched. However, it is also possible to use a control circuit 16' such as is shown in FIG. 5, which is instead operated from a single power supply V. With the 0V common rail offset from true ground by around 10V, by switching the P23/ANI3 (ilium) pin on the microcontroller IC1, the effective polarity of the terminals S1 and S2 can be reversed. When the current is reverse biased with respect to the diode D1, analogous to FIG. 4a, resistors R47 and R61 create a potential divider with the thermistor T1 in the appliance and again a voltage is generated at pin P20/ANI0 of the microcontroller IC1, which is proportional to the temperature of liquid in the appliance. When the current is forward biased with respect to the diode D1 then the motor M1 is switched into the parallel circuit, analogous to FIG. 4b.

The functional components connected in parallel with the two connections S1 and S2 are not limited to a motor M1 and a thermistor T1 as shown in the exemplary circuits described above. In a liquid heating vessel not requiring any liquid circulation, for example, the pump motor M1 and diode D1 could be replaced by one or more LEDs used for illumination and/or indication purposes. Where the second functional component is an LED the switch means may be provided integrally without the need for a separate diode. In other words, the LED will only draw a current when it is forward biased by the polarities applied to the connections 51 and S2. Of course either of the functional components could be any other electrical component as required by the functions of the appliance, such as e.g. a heater, light means, buzzer, sensor, etc. Regardless of the nature of the two functional components, the parallel circuit arrangement allows the current to be applied/measured in one component rather than the other depending on the relative polarities of the two connections S1, S2. The switch, e.g. diode, may be provided in either branch of the circuit diagram. The choice of location may depend on the nature of the functional components and their relative power consumptions.

In another embodiment the motor M1 may be replaced by a magnetic switch such as a reed switch or Hall sensor. This may relate to an appliance similar to the one shown in FIGS. 1 and 2 in that it comprises an infusion basket but with the water pump omitted. In this appliance, water may be heated in the vessel to make an infusion beverage but there is no circulation of the heated liquid. In such an appliance it may be desirable to detect when the infusion basket is in position, so that the heater is only energized when a basket is in the vessel. In this embodiment a magnetic switch and a thermal sensor such as a thermistor can be connected in parallel between the terminals S1 and S2 of the cordless connector, with a diode D1 provided to allow for selective energization in response to a change of polarity. The parallel circuit may be arranged so that a signal is mainly provided from the thermistor, so as to monitor the temperature of liquid in the vessel, but when the polarity of the connections S1 and S2 is temporarily switched there is provided a signal from the magnetic sensor instead. If this signal is absent or has changed then it will indicate that the infusion basket has been removed and thus the heater can be switched off.

Figure 6:
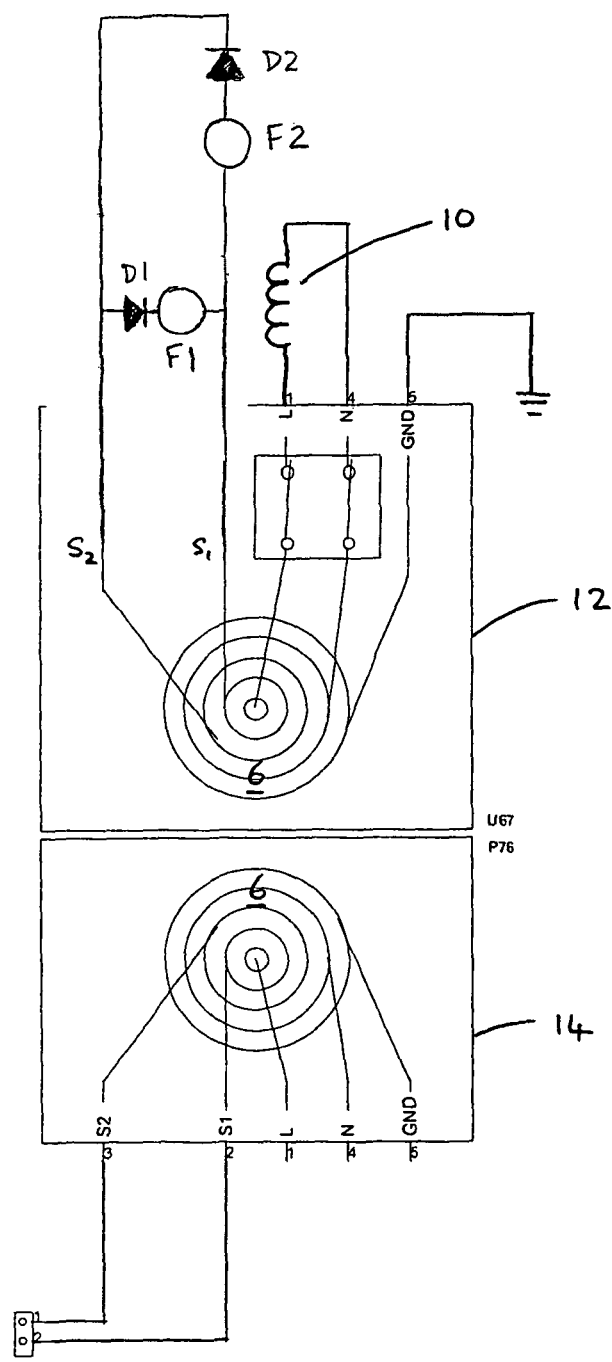
FIG. 6 is a schematic partial circuit diagram showing an alternative arrangement of components between the electrical connections S1 and S2 according to another embodiment of the invention.

While the embodiments described above comprise a single diode D1 as the switch means in the parallel circuit connected to the contacts S1 and S2 of the connector 6, additional switches may be employed. For example, there is shown in FIG. 6 an alternative arrangement of the parallel circuit in which first and second functional components F1 and F2 are each connected to respective diodes D1 and D2 which oppose a reverse current in opposite directions to one another. Thus it can be seen that when contact S2 is positive relative to contact S1 then a current can only flow in one branch of the circuit to functional component F1. On the other hand, when the polarities are reversed such that contact S2 is negative relative to contact S1 then a current can only flow in the other branch of the circuit to functional component F2. Such a circuit ensures that only one of the two functional components is drawing a current at any one time. The control circuit can switch completely between the two functional components.

Figure 7:
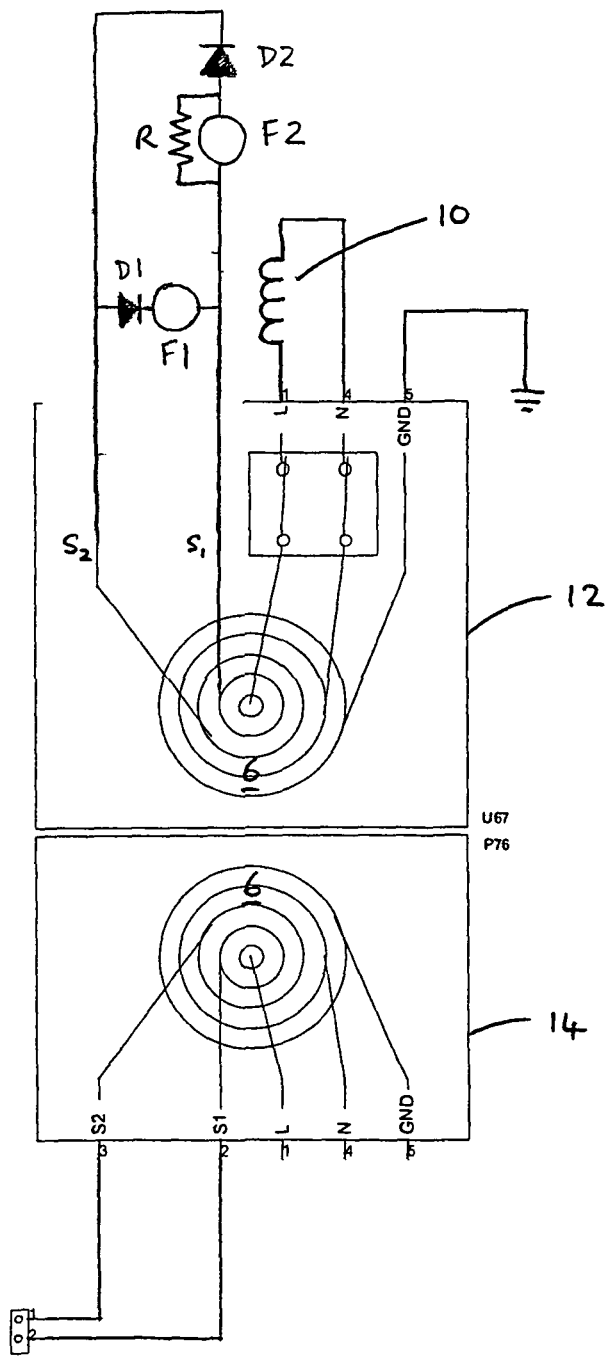
FIG. 7 is a schematic partial circuit diagram showing an alternative arrangement of components between the electrical connections S1 and S2 according to another embodiment of the invention.

Another embodiment is illustrated in FIG. 7, which has the same circuit arrangement as FIG. 6 except that in addition a resistor R is connected in parallel with one of the functional components F2. The resistor R could instead be connected in parallel with the other functional component F1, or a resistor could be provided for each of the functional components F1, F2. The purpose of the resistor(s) R is to enable the relevant functional component e.g. F2 to be identified.

Although a heater 10 has been described as the main component connected to the power terminals of the connector 6, it will be appreciated that other electrical or electro-mechanical components may be powered by the cordless connector 6 instead, depending on the appliance. The heater could, for example, be replaced by a motor.

Furthermore it will be appreciated that the parallel circuits described above need not necessarily be connected to the two additional terminals S1 and S2 in a 5-pole cordless connector. Instead, such a parallel circuit could be connected in place of the heater with a 3-pole cordless connector making electrical connection to two functional components in the appliance. The advantages afforded by switching between two functional components connected to a common pair of connections could be equally realized in a 3-pole connection system.

Figure 8A:
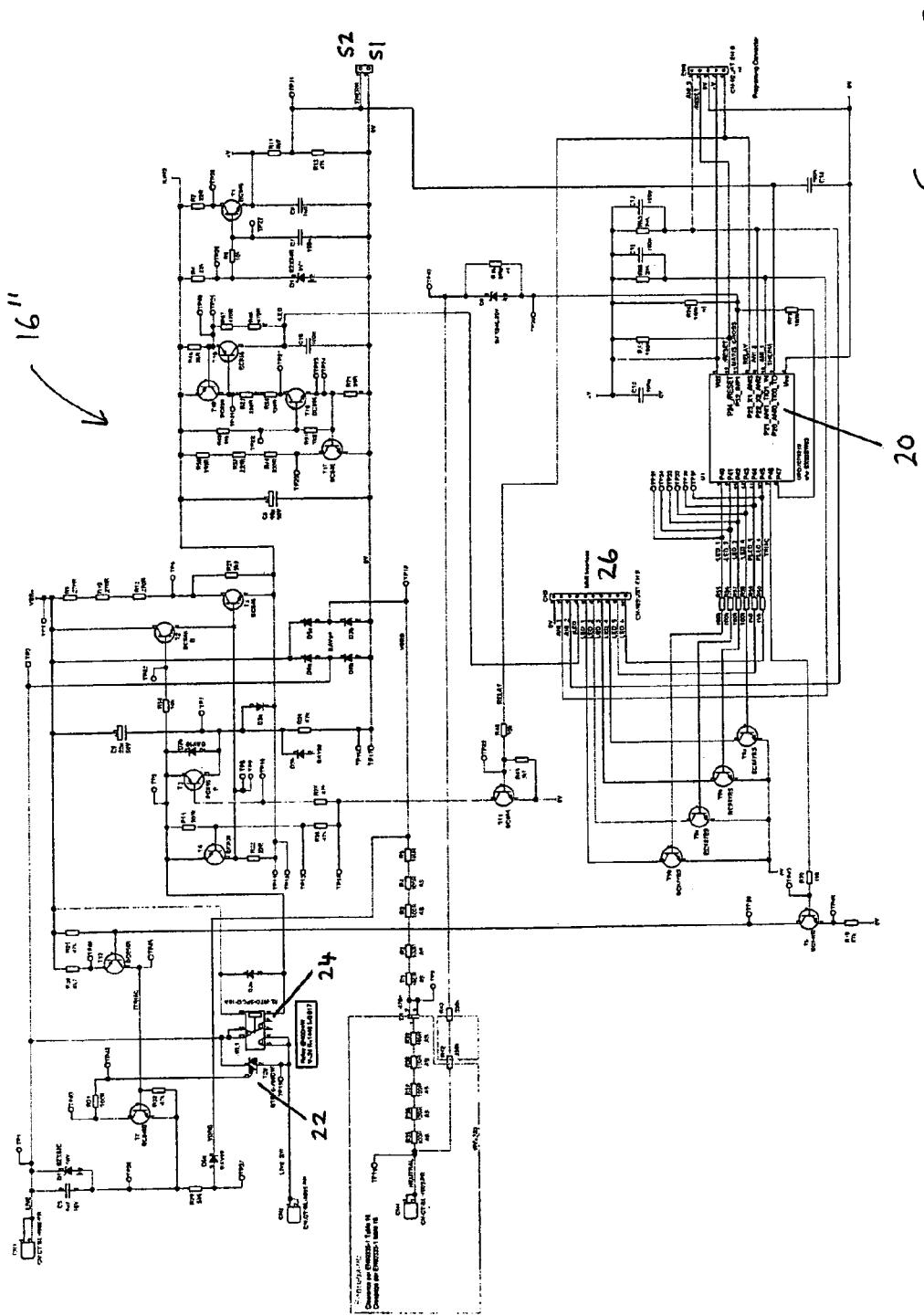
FIG. 8a is a schematic circuit diagram showing a control system according to a further embodiment of the invention and FIG. 8b is a schematic circuit diagram for the associated user interface.
Figure 8B:
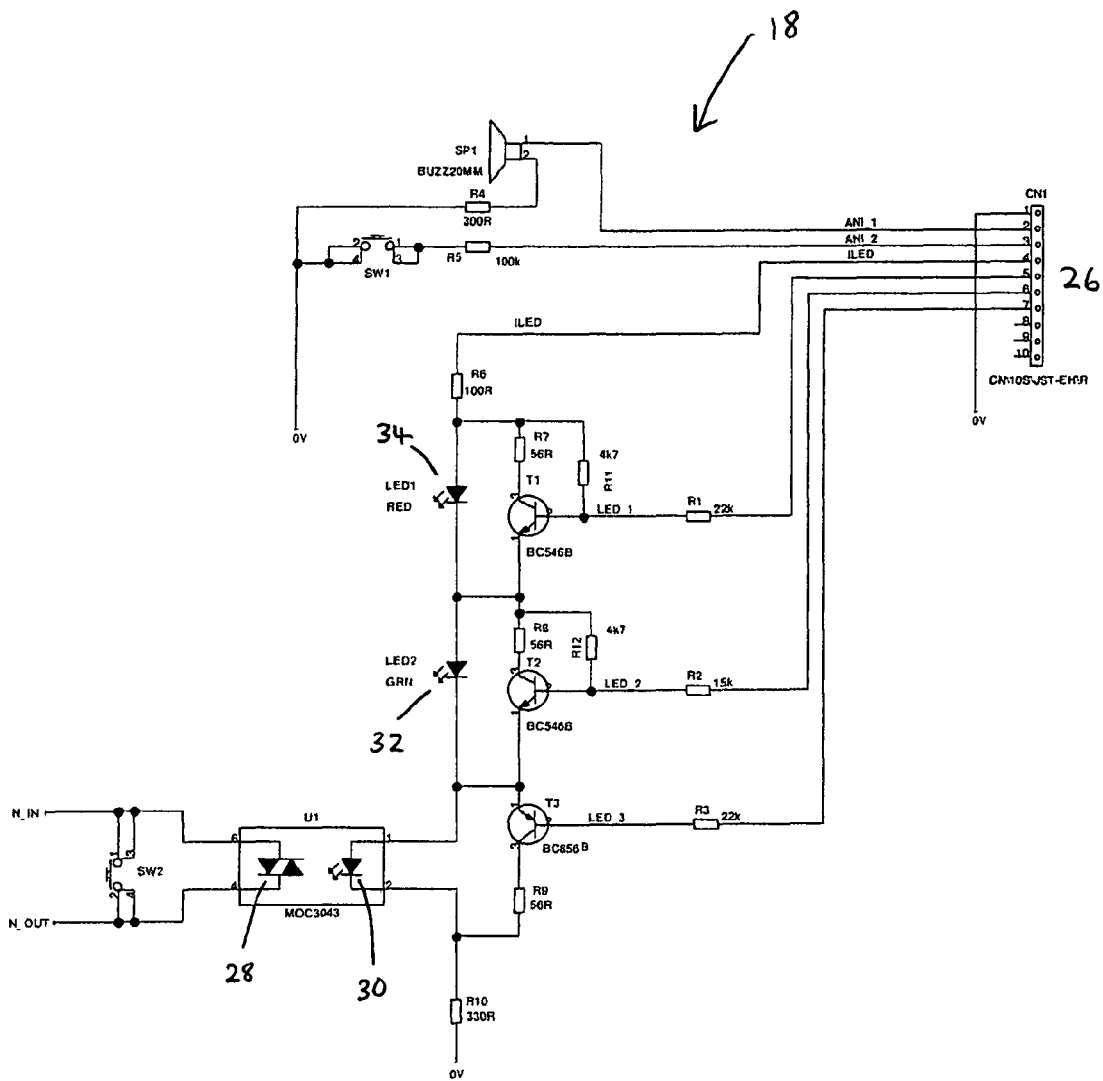

A further alternative control circuit 16" is shown in FIG. 8a, together with a corresponding user interface circuit 18 in FIG. 8b. It can be seen from FIG. 8a that the control circuit 16" is similar to the embodiments described above in terms of its basic layout. An integrated controller 20 controls the electrical connections to the five terminals of the cordless connector (not shown). Contacts S1 and S2 are used to connect to the two additional poles of the connector in a similar manner as is described above. In the control circuit 16" there are two switches provided in parallel for controlling the supply of power to the appliance through the live and neutral poles of the connector, namely a triac 22 and a relay 24.

The control circuit 16" of FIG. 8a has an electrical connection, generally designated as 26, with the user interface circuit 18 of FIG. 8b. In the user interface circuit 18 there is provided an appliance ON switch SW2 and at least one user input switch SW1. Of course further user input switches may also be provided (although not shown), for example connected in parallel with SW1. Both switches SW1 and SW2 are momentary switch contacts. The switches SW1 and SW2 may be activated by a single common actuator or by separate actuators. The switches SW1 and SW2, and others, may be activated via a physical user interface 5 such as is shown in FIG. 1. The user interface 5 may comprise push buttons and/or a touch screen.

In the user interface circuit 18 the ON switch SW2 is connected in parallel with an opto-isolator U1 formed by a triac 28 and an LED 30. Illumination of the LED triggers the triac 28. Two further LEDs are provided for indicating purposes, a green LED 32 and a red LED 34, connected in series with the LED 30 of the opto-isolator U1. LED 32 and LED 34 are independently switchable by transistors T1, T2 and T3.

The user input switch SW1 is connected to an analogue input pin ANI_2 of the controller 20 via the connection 26. A resistor R5 in series with the switch SW1 in the user interface circuit 18, together with a resistor in the control circuit 16", determines the magnitude of the input at the controller 20. The user input switch SW1 may conveniently be used to input various commands to the electronic control unit 20. For example, it may be arranged so that a single press, a double press, a short press, a long press, etc. of the input switch SW1 each represents a different command. A short press could, for instance, tell the controller 20 to initiate a heating cycle in the appliance while a long press could tell the controller 20 to turn off power to the appliance.

Further switches connected in parallel to SW1, each fitted in series with a different resistor, could modify the magnitude of the input to the controller 20. So, for example, activating another switch in parallel with SW1 could form a potential divider circuit which changes the magnitude of the input and the controller 20 could interpret that magnitude as representing a desired heating temperature. Different parallel switches could therefore be used to indicate different heating temperatures to the controller 20. The user input switch SW1 may therefore provide multiple functions in addition to providing a manual switch-off.

Operation of the control system shown in FIGS. 8a and 8b will now be described. When the ON switch SW2 is momentarily activated, there is provided a current path bypassing the opto-isolator U1 which provides power to the controller 20. Upon activation the control unit 20 switches on the LED 30 in the opto-isolator U1 to optically trigger the triac 28 and close the power circuit. The control unit 20 is thus continuously powered once the switch SW2 has been actuated and released. The controller 20 then determines whether it is appropriate to power the appliance (for example depending on its default program and/or user inputs) and closes one or both of the switches 22, 24 accordingly so that power is supplied to the cordless connector and hence to the appliance part. The controller 20 subsequently controls the operation of components in the appliance depending on its stored programs and any further inputs from the user. As described above, the user input switch SW1 may be activated to give commands to the controller 20.

When the controller 20 determines that a desired operation of the appliance has been completed, it controls the parallel switches 22, 24 to disconnect the live line of the cordless connector e.g. to switch off heater. Alternatively, if a user decides to turn off the appliance, the user input switch SW1 may be activated to send a signal to the controller 20 that the appliance is to go into 'standby' mode and it will control parallel switches 22, 24 to disconnect the live line of the cordless connector on demand. Either way, in standby mode the controller 20 remains connected to the power supply for a predetermined period of time, in case a user decides to activate the appliance again. The controller 20 draws a low background current corresponding to ~0.5 W even in standby mode.

If the user input switch SW1, or another input, is activated during the standby period then the controller 20 is connected to the power supply ready to receive and process commands. It can re-connect power to the appliance via the cordless connector as necessary. This will re-set the standby period.

After a predetermined period of standby, e.g. 60 seconds, has lapsed since the last operation of the appliance, the controller 20 deactivates the LED 30 in the opto-isolator U1 and the control circuit 16" is then disconnected from the mains power supply. There is thereby provided an automatic shut down (zero power mode i.e. 0 W) when the appliance is not in use. No further manual intervention is required.

Once the appliance is in zero power mode, to re-energize the control unit 20 it is necessary for a user to activate the ON switch SW2 This connects the controller 20 to the mains power supply so that it can operate to latch the triac 28 of the opto-isolator U1 using the LED 30 and thus power is once again provided to the control circuit.

Figure 9A:
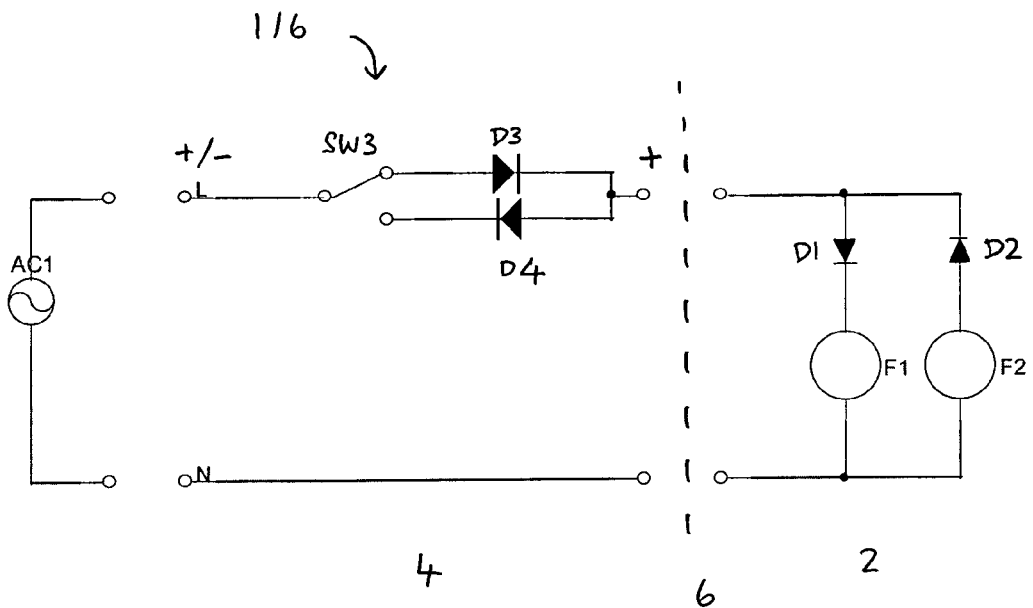
FIGS. 9a and 9b show a schematic circuit diagram for a control system according to another embodiment of the invention.
Figure 9B:
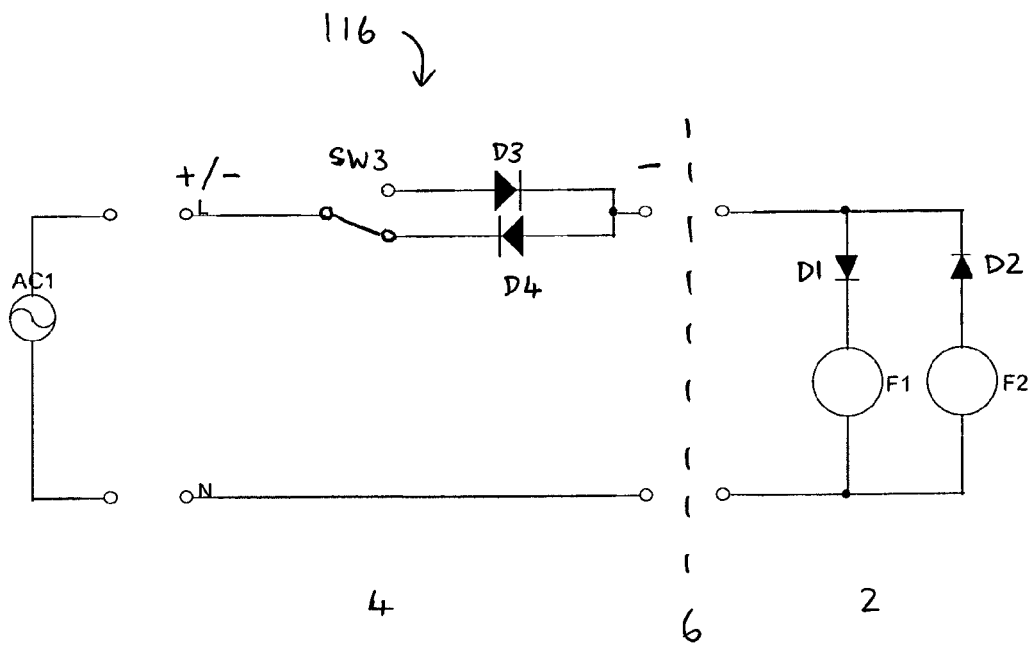

Another embodiment of a control system for the appliance will now be described with reference to FIGS. 9a and 9b. This control system 116 is adapted for alternating current (AC) power to be supplied by the base 4 to the terminals of the connector 6. For simplicity there is only shown the neutral N and line L connections, although a ground connection may also be provided. The dashed line indicates where a cordless electrical connector 6 is provided between the base 4 and the appliance 2. The two electrical connections L, N are provided for a pair of functional components F1, F2 that are arranged in a parallel circuit in the appliance 2. The first functional component F1 may, for example, comprise a thermistor while the second functional component F2 may, for example, comprise a motor, as is described above with respect to foregoing embodiments. Respective diodes D1, D2 are connected in series with the functional components F1, F2 in each branch of the parallel circuit.

In order for the base 4 to be able to selectively energize either the functional component F1 or the functional component F2, a pair of diodes D3, D4 are arranged in parallel in the base 4 so as to rectify the alternating current. A switch SW3 is provided to control the rectification, which may be controlled e.g. by a microcontroller (not shown) in the base 4. When the AC signal is switched to the diode D3, as shown in FIG. 9a, only the positive half of the voltage is transmitted to the connector 6 as a rectified signal. The positive polarity means that the diode D1 in the appliance allows a current to flow through the component F1 but the reverse diode D2 prevents a current from passing to the component F2 in the parallel branch of the circuit. The polarity of the voltage is reversed by switching the AC signal to the diode D4, as shown in FIG. 9b, so that only the negative half of the voltage is transmitted to the connector 6 as a rectified signal of opposite polarity. There is now a reverse current with respect to the diode D1 so no current can flow in the branch of the circuit including the functional component F1 but F2 is energized instead. Of course such rectification of an AC signal may be achieved by other arrangements than the diodes D3, D4 shown here.

The circuits described herein are exemplary and many modifications and variations will occur to the skilled person.

The cordless appliance could be a liquid heating vessel for any of a range of beverages such as teas (including fine leaf teas and herbal infusions), coffee, hot chocolate, cold remedies, and other warm beverages. Furthermore appliances other than a liquid heating vessel could benefit from the cordless connector and circuit arrangements described herein. In fact the appliance may not comprise a liquid heater at all. The present invention is not limited to a particular type of cordless electrical appliance.

Although this invention has been shown and described with respect to the detailed embodiments thereof, it will be understood by those skilled in the art that various changes in form and detail thereof may be made without departing from the spirit and the scope of the invention.

What is claimed is:

1. A cordless electrical appliance comprising:
   an appliance comprising at least a first and a second electrical functional component, each of the first and second functional components being selected from: a heater, a sensor, an illuminating device, a liquid pump, a motor, a display, a sound emitter or a microcontroller;
   a base for supplying electrical power to the appliance; and
   a cordless electrical connector for making electrical connection between the appliance and the base in use;
   wherein both the first and second functional components are connected electrically in parallel in a circuit between a pair of two electrical connections provided by the connector; and
   a unidirectional switch device is provided in the circuit between the first and second functional components, the unidirectional switch device being arranged to switch ON or OFF depending on the relative polarities of the two electrical connections such that which of the functional components is energized depends on the relative polarities of the two electrical connections; and
   wherein one of the base or the appliance comprises a control device comprising an electronic control unit to control the relative polarities of the two electrical connections.

2. The appliance as claimed in claim 1, wherein the pair of electrical connections are connected to a DC supply.

3. The appliance as claimed in claim 1, wherein the pair of electrical connections do not carry any digital signals.

4. The appliance as claimed in claim 1, wherein said unidirectional switch device is associated with the first functional component, in one branch of the parallel circuit, and a second unidirectional switch device is associated with the second functional component, in the other branch of the parallel circuit.

5. The appliance as claimed in claim 1, wherein the unidirectional switch device is a diode.

6. The appliance as claimed in claim 4, wherein said unidirectional switch device that is arranged to operate in one direction while said second unidirectional switch device is arranged to operate in the opposite direction.

7. The appliance as claimed in claim 1, wherein a first functional component comprises a sensor and the second functional component comprises an operational device selected from: a heater, an illuminating device, a liquid pump, a motor, a display, a sound emitter or a microcontroller.

8. The appliance as claimed in claim 7, wherein the operational device is arranged in the same branch of the parallel circuit as the unidirectional switch device.

9. The applicance as claimed in claim 7, wherein the operational device is switched off only when it is required to take a measurement from the sensor.

10. The appliance as claimed in claim 1, wherein the first functional conponent comprises a first sensor and the second functional component comprises a second sensor.

11. The appliance as claimed in claim 1, wherein a resistor is connected in parallel with the first or second functional component so as to provide a predetermined resistance value between the pair of electrical connections enabling the appliance or first functional component or second functional component to be identified.

12. The appliance as claimed in claim 1, wherein the cordless electrical connector comprises a 3-pole cordless electrical connector and the pair of electrical connections are integrated with the power connections.

13. The appliance as claimed in claim 1, wherein the cordless electrical connector comprises a multi-pole cordless electrical connector comprising power connections in addition to the pair of electrical connections.

14. The appliance as claimed in claim 1, wherein the cordless electrical connector is of the type which allows placement of the appliance on the base substantially irrespective of their relative angular orientation.

15. The appliance as claimed in claim 1, wherein the base comprises the electronic control unit and the electronic control unit controls both a first further switch device arranged to disconnect the supply of power from the base to the cordless electrical connector and a second further switch device arranged to disconnect the supply of the power to the control unit.

16. The appliance as claimed in claim 4, wherein the second unidirectional switch device is a diode.

* * * * *